United States Patent [19]

Tsujimoto et al.

[11] 4,107,709
[45] Aug. 15, 1978

[54] EXPOSURE TIME CONTROL CIRCUITRY FOR CAMERAS

[75] Inventors: Kayoshi Tsujimoto; Akira Yoshizaki, both of Osaka, Japan

[73] Assignee: Minolta Camera Kabushiki Kaisha, Osaka, Japan

[21] Appl. No.: 762,721

[22] Filed: Jan. 26, 1977

Related U.S. Application Data

[63] Continuation of Ser. No. 645,424, Dec. 30, 1975, abandoned.

[30] Foreign Application Priority Data

Dec. 31, 1974 [JP] Japan .................... 50-1378

[51] Int. Cl.² .............................................. G03B 7/08
[52] U.S. Cl. ...................................... 354/51; 354/38; 354/60 R
[58] Field of Search ................... 354/23 R, 24, 29, 30, 354/38, 48, 50, 51, 60 R

[56] References Cited

U.S. PATENT DOCUMENTS

| | | | |
|---|---|---|---|
| 3,678,823 | 7/1972 | Sato | 354/50 |
| 3,712,194 | 1/1973 | Yoshimura | 354/51 |
| 3,728,946 | 4/1973 | Kuramoto et al. | 354/51 |
| 3,733,984 | 5/1973 | Yata | 354/51 |
| 3,815,148 | 6/1974 | Yata et al. | 354/51 |
| 3,886,443 | 5/1975 | Miyakawa et al. | 354/60 R |
| 3,950,765 | 4/1975 | Nanba et al. | 354/51 |
| 3,968,502 | 7/1976 | Shiozawa et al. | 354/60 R |

*Primary Examiner*—Russell E. Adams
*Attorney, Agent, or Firm*—Watson, Cole, Grindle & Watson

[57] ABSTRACT

In an exposure time control circuit for a camera adapted for manual and automatic exposure control, the resistance of a single variable resistance element is varied by a first movable member moved in accordance with at least the setting of the film sensitivity and by a second movable member moved in accordance with the manually set exposure time. Switching means connect either the first or the second independently movable member into the time control circuit. A manually operable second switching means set to a first position produces a first output signal between a photoelectric element and the variable resistance and in a second position produces a second output signal formed between a fixed resistor and the variable resistance element.

The first independently movable member may also be moved in accordance with the diaphragm aperture setting. The means for switching the first and second independently movable members may be interlocked with the second switching means controlling the automatic or manual mode of exposure control. An indication of the optimum exposure control may be provided in either the automatic or manual exposure control mode in a further modification of the apparatus which includes an additional switch associated with the variable resistance element and which is independently operable from the second means for switching.

20 Claims, 5 Drawing Figures

EXPOSURE TIME CONTROL CIRCUITRY FOR CAMERAS

This is a continuation, of application Ser. No. 645,424 filed Dec. 30, 1975, now abandoned.

BACKGROUND OF THE INVENTION

The present invention relates to automatic exposure time control circuits for cameras and, more particularly, to such circuits that are capable of selective automatic or manual exposure control.

In the field to which the invention relates, there are known exposure time control circuits for cameras which include a light measuring circuit having a photoelectric element, a shutter control circuit responsive to the output of the light measuring circuit, means for setting at least the value of film sensitivity for automatic exposure time control, means for manually setting the shutter speed with manual exposure time control, and switching means for alternatively selecting either automatic or manual exposure time control. However, such known circuitry requires two variable resistors. For example, a first variable resistor provides a signal in accordance with the film sensitivity and diaphragm aperture setting and is included in the light measuring circuit. A second variable resistor provides a signal representative of the manual shutter speed setting and is included in the shutter control circuit as shown, for example, in U.S. Pat. No. 3,728,946.

SUMMARY OF THE INVENTION

An object of the present invention is to provide exposure time control circuitry capable of selective automatic or manual exposure control utilizing only one variable resistance element for selectively providing either a signal representative of at least film sensitivity or the manual shutter speed setting.

Another object of the present invention is to provide exposure time control circuitry capable of selective automatic or manual exposure control having an exposure time indicating means adapted for such circuitry as specified herein.

Pursant to the present invention, the first mentioned object is basically achieved using a single variable resistance element having two independently selectable operable slider elements; one of the slider elements providing signals representative of the manual shutter speed setting, and the other providing signals commensurate with at least the film sensitivity setting. Automatic exposure control is performed in accordance with an output determined by a photoelectric element and one of the independently operable slider elements, wherein the position of the slider on the variable resistance element is at least representative of the film sensitivity setting. The same slider element may also be positioned in accordance with the diaphragm setting. Manual exposure control is performed in accordance with an output determined by the flow of a constant current through a fixed resistor and the resistance of the same variable resistance element as determined by the position of the other of the slider elements thereon. That output is representative of the manual shutter speed setting. Switching means are provided to selectively connect and disconnect one of the slider elements from the exposure time control circuitry in accordance with the exposure operations of the camera.

If indicating means is desired to be added to the above mentioned circuitry for indicating the exposure time according to the light measuring output with manual exposure control, means must be provided to produce a light measuring output (i.e., an output determined by the photoelectric element and the variable resistance element representative of at least film sensitivity) in the manual exposure control mode since the variable resistance element inherently does not provide a signal representative of at least film sensitivity but a signal representative only of the manual shutter speed setting. Therefore, the second mentioned object of the present invention relates to the circuitry necessary to overcome such a difficulty. Thus pursuant to the present invention, the second mentioned object of the present invention is basically achieved by a predetermined relationship between the operation of the switching means associated with the variable resistance element and the switching means associated with means for storing, such as a capacitor, the aforementioned outputs.

DETAILED DESCRIPTION OF THE INVENTION

Figure 1:
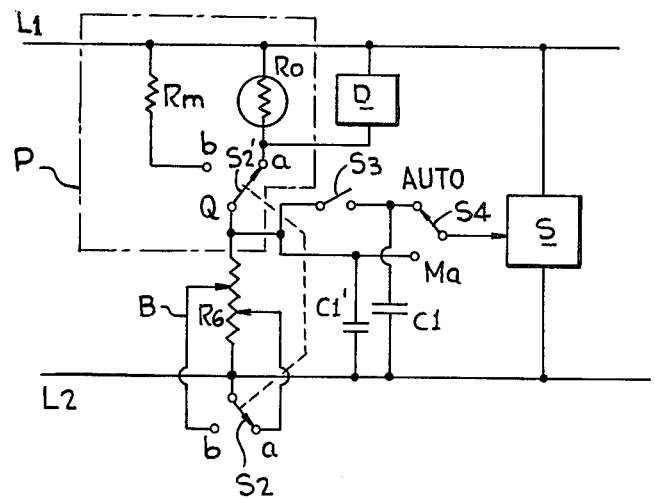
FIG. 1 is a circuit diagram illustrating a first embodiment of the present invention.

FIG. 1 shows a simplified embodiment illustrative of the principle of operation incorporated in the present invention. Conductors L1, L2 are connected to a suitable power source through a switch actuated by an exposure release mechanism well known to those skilled in the art (both elements not shown). Ro is a light-measuring photoconductive element, Rm is a fixed resistor, and R6 is a variable resistance element, such as a dual slider element potentiometer, which serves the two functions of providing signals respectively representing the diaphragm and film sensitivity settings to a light measuring circuit, and the manual shutter speed setting in cooperation with fixed resistor Rm. Variable resistance element R6 is provided with two slider elements A and B, slider element A is operated in accordance with the operations associated with the diaphragm aperture and film sensitivity settings, and slider element B is operated in accordance with the manually selected shutter speed setting. Ganged switches S2, S2' are interlocked with the operation of a shutter release mechanism (not shown). Switches S2, S2' are normally closed on their respective contacts a, as shown in FIG. 1, and moved to their respective contacts b, after switch S3 has been opened. Switch S3 interrupts the connection between light measuring circuit P and capacitor C1 for storage of the TTL (through-the-lens) light measuring output prior to the movement of the mirror from its viewing position to its picture taking position, as is well known to the art. The timing of the actuation of switches S2, S2' and S3 is of importance, because if, for example, switches S2, S2' are switched from contact a to b before switch S3 has been opened, then a voltage not representative of the TTL measurement of light intensity will be charged and stored by capacitor C1. In this respect, in case the indication of the TTL light measurement is not required with a manual exposure setting, switches S2, S2' are moved to their respective contacts a for automatic exposure control, and the same switches are moved to their respective contacts b for manual exposure control. Change-over switch S4 provides either a manual or an automatic exposure control setting.

For automatic exposure control, change-over switch S4 remains connected to the AUTO contact, whereas switches S2, S2' are changed-over to their respective contact b after switch S3 has been opened to isolate capacitor C1 from point Q, and capacitor C1 has completed its storage operation, so that the shutter may be controlled according to optimum exposure signal Q, which appears at the junction of photoconductive element Ro and variable resistance element R6. The voltage across the end terminals of variable resistance element R6 is determined by the position of slider element A with switch S2 at contact a. With switch S2 at contact a, the position of slider element B of variable resistance element R6 is not electrically effective.

For manual exposure control switch S4 is manually moved to contact Ma, whereby the voltage appearing at point Q is continuously provided to switching circuit S, regardless of whether switch S3 is open or closed. Prior to the well-known movement of a mirror from its viewing position to its picture taking position, switches S2, S2' are at their respective contact a, so that an optimum exposure signal appears at point Q, which signal incorporates the output of photoconductive element Ro, the resistance of which is responsive to the TTL light impinging thereon and the current through potentiometer R6, the resistance of which is set by the position of slider element A. Accordingly, the optimum exposure level prior to the exposure may be indicated by means of indicating circuit D.

In the case of manual exposure control, switch S3 is opened prior to the movement of the mirror from its viewing position to its picture taking position, followed by the change-over of wwitches S2, S2' to their respective contacts b, so that the voltage at point Q is in accordance with the manually set shutter speed as determined by fixed resistor Rm and variable resistance element R6, the effective resistance of which is set by the position of slider element B. Voltage Q is provided by switch S4 to shutter speed control circuit S, so that the shutter is actuated at the manually set shutter speed. Capacitor Ci is a secondary element for stabilizing the operation of the circuit upon manual exposure. An exemplary structure for variable resistance element R6 is described hereinafter with respect to FIG. 5. However, from the above description of the operation of the structure of FIG. 1, it is apparent that slider element A of variable resistance element R6 is moved in accordance with the setting of the diaphragm aperture and the film sensitivity setting for automatic exposure control. Independently operable slider element B is connected to structure for manually setting the shutter speed in the manual exposure control mode of operation.

If indicating circuit D is not required, switch S2 and S2' are interlocked with switch S4 and manually moved.

Figure 2:
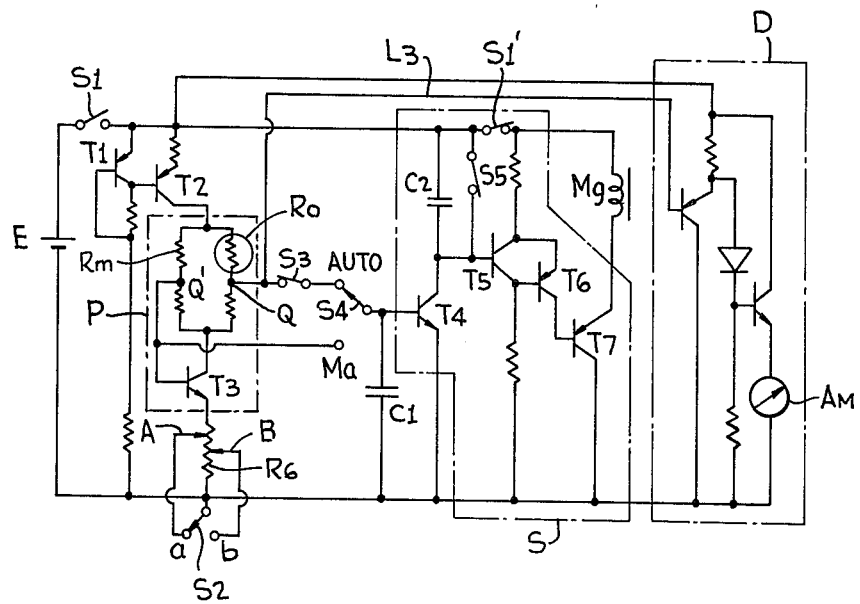
FIG. 2 is a circuit diagram illustrating a second embodiment of the present invention.

The arrangement of the embodiment shown in FIG. 2 is substantially similar to that of FIG. 1 except for the following: (i) there may be obtained at point Q a TTL light measuring output which is proportional to the logarithmic value of the quantity of light incident on light measuring element Ro, which is a composite photoconductive element in this embodiment, and (ii) switch S2' as shown in FIG. 1 is omitted in the modified structure of FIG. 2 so that the manually set shutter-speed control output is obtained at point Q', and the automatic shutter speed control output is obtained at point Q. Like parts are designated by the same reference numerals throughout FIGS. 1 and 2. Switches S1 and S1' may be closed by a shutter release mechanism (not shown) to respectively connect battery E to the exposure control circuitry and to shutter speed control circuit S in a manner that is well known to those skilled in the art. Transistor T1 provides a constant voltage to the base of transistor T2, whereby the collector current thereof is made constant to actuate light measuring circuit P therewith.

The resistance of variable resistance element R6 varies linearly in accordance with the position of either slider element A or B. Transistor T3 compensates for changes in temperature. Switch S5 is adapted to be opened concurrently with the opening of the shutter mechanism (not shown). Switch S5 allows transistor T4 collector current to flow to timing capacitor C2, which current is proportional to the brightness of an object for automatic exposure control or proportional to the manually set shutter speed for manual exposure control. Anti-logarithmically converting transistor T4 is controlled according to the voltage stored by capacitor C1 which voltage is proportional to the logarithmic value of the quantity of light incident on light measuring element Ro. When the voltage of capacitor C2 reaches a given level, then the operation of a Schmidt circuit, consisting of transistors T5, T6 is inverted, so that the current to energize electromagnetic Mg provided by transistor T7 is interrupted to permit the closing of the shutter (not shown). Exposure-level indicating circuit D receives the voltage at point Q, via conductor L3, thereby indicating the exposure level on meter Am. The structure and operation of indicating circuit D as shown in FIGS. 2 and 3 are well known to those skilled in the art such that a detailed description of its operation is not considered necessary for the purposes of the present invention.

Figure 3:
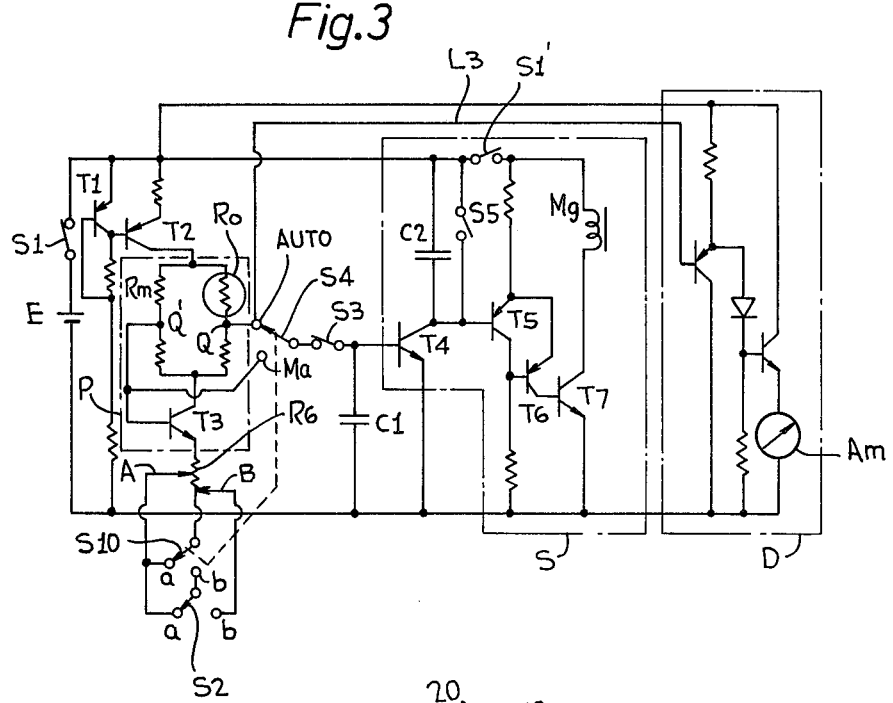
FIG. 3 is a circuit diagram illustrating a third embodiment of the present invention.

The third embodiment shown in FIG. 3 is similiar to that shown in FIG. 2 except that switch S3 is positioned between switch S4 and storing capacitor C. Also, switch S10 is connected between one terminal of variable resistance element R6 and switch S2. Switch S10 is interlocked with auto-manual change-over switch S4, whereby switch S10 is moved to contact a for the automatic exposure control mode, and switch S10 is moved to contact b for the manual exposure control mode. FIG. 3 shows the status of switch S10 for the automatic exposure control. However, switch S2 is changed-over from contact a to b before switch S3 is opened prior to the movement of the mirror from its viewing to its picture taking position. Thus, the timing sequence of switches S2, S3 is inverted as compared with that of the embodiments of FIGS. 1 and 2. Moreover, even if switch S2 is moved to contact b before switch S3 is opened, switch S10 remains at contact a (because switch S10 is a manually operated switch interlocked with switch S4 and switch S2 is independently operated with respect to switches S4 and S10).

Accordingly, the light measuring output is impressed on capacitor C with switch S3 closed, and switches S4 and S10 on the AUTO contact and contact a, respectively. Thus in the automatic mode, with switches S4 and S10 respectively on contacts AUTO and a, the light measuring output Q, incorporating the diaphragm and film sensitivity information, is imparted to indicating circuit D via conductor L3.

For the manual exposure control mode, switches S4, S10 are moved to, and remain at, contact Ma and contact b, respectively. In that case the voltage output at Q is the same as that for the automatic mode, until switch S2 is moved to contact b. However, until switch S2 is moved from contact a to contact b, the voltage at point Q incorporating the diaphragm and film sensitivity information is imparted to indicating circuit D to give the camera operator an indication of the optimum shutter speed control. With switches S4 and S10 respectively on contacts Ma and b, and switch S2 on contact a, voltage Q' is neither a signal for automatic exposure control nor a signal representative of a shutter speed which has been set manually. However, when switch S2 is moved to contact b, before switch S3 is opened, the voltage determined by variable resistance element R6, the resistance of which is then governed by slider element B and the constant resistor Rm, voltage Q' represents a signal commensurate with the manually selected shutter speed. At the time switch S2 is moved to contact b, the voltage appearing at point Q' is stored by capacitor C.

Figure 4:
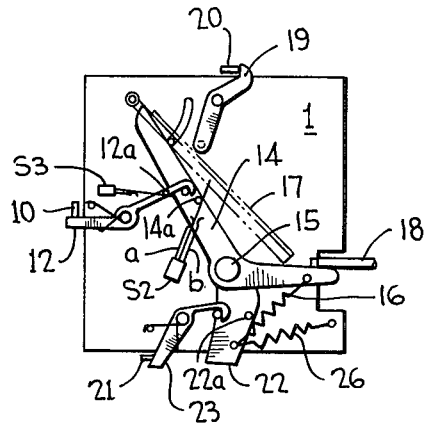
FIG. 4 is a side view of an example of the mechanism for controlling certain of the switching elements of the circuitry shown in FIG. 2.

FIG. 4 is illustrative of a mechanism for actuating switches S2, S3 in the circuit of FIG. 2. When the shutter button (not shown) is depressed, then member 10, connected thereto, is depressed to rotate lever 12 counterclockwise, thereby releasing lever 14 from its locked condition. At this time switch S3, which has been closed by upright pin 12a on lever 12, is opened. Lever 14 is rotated clockwise about pivot 15 by the force of spring 16, upon its being released from its locked condition, thereby forcing mirror 17 upwardly from its viewing position to its picture taking position. At this time, switch S2 is changed-over from contact a to b, by pin 14a on lever 14. According to the aforesaid arrangement switch S2 is changed-over, after switch S3 has been opened.

Diaphragm-presetting lever 18 is adapted to move downwardly following the movement of lever 14, when lever 14 is rotated, thereby stopping-down the diaphragm of the camera to a preset diaphragm value as is well known to those skilled in the art. At the termination of the clockwise rotation of lever 14, it rotates lever 19 counterclockwise, thereby moving leading curtain locking piece 20 for the shutter in the direction necessary to release the leading curtain in a manner that is also known to those skilled in the art. A mechanical signal representing the completion of the closing operation of the shutter is transmitted to member 21 by structure known to those skilled in the art, so that lever 23 is rotated counterclockwise with the result that lever 22 is released from its locked condition. Thereby, lever 22 is rotated counterclockwise by the force of spring 26, thereby rotating lever 14 back to the position shown in FIG. 4. Thereafter, lever 12 is returned to the position shown, in response to the shutter-cocking operation, to lock lever 14 as illustrated.

In case of the circuit of FIG. 3, switch S2 is charged over by member 10 in FIG. 4 before switch S3 is opened by the rotation of lever 12.

Figure 5:
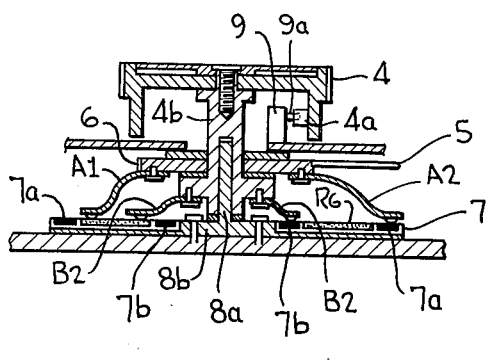
FIG. 5 is a sectional view of an exemplary single variable resistance element capable of being used in the embodiments of FIGS. 1, 2 and 3.

FIG. 5 shows an embodiment of variable resistance element R6. Sector-shaped resistor R6 is mounted on circular base plate 7 and is provided with two sliding elements A, B as described above with respect to FIGS. 1–3. Variable resistance element R6 is formed with inner arcuate conductor 7b and outer arcuate conductor 7a, corresponding to the respective conductors between sliding element B and contact b, and sliding element A and contact a of FIGS. 1–3. Sliding element A of FIGS. 1–3 consists of two arms A1, A2 as shown in FIG. 5, and each arm A1, A2 is secured to pulley 6. Arms A1 and A2 respectively contact resistor R6 and conductor 7a in spanning relationship. Pulley 6 collaborates with a diaphragm and film sensitivity setting mechanism (not shown) via cord 5. Sliding element B of FIGS. 1–3 also consists of two arms B1, B2 as shown in FIG. 5, and each arm B1, B2 is secured to shaft 4b, which extends through pulley 6 to be independently rotatable with respect thereto. Arms B1 and B2, respectively, contact resistor R6 and conductor 7b in spanning relationship. Manually operated shutter speed setting dial 4 is secured to shaft 4b. Dial 4 is provided with a cavity on its underside, into which projection 4a projects. Thus, when dial 4 is set to the AUTO position, projection 4a pushes button 9a of switch box 9, which contains switch S4, for urging the movable contact (not shown) of switch S4 to fixed contact AUTO as shown in FIG. 2. In case of the circuit of FIG. 3, switch S10 is further provided in switch box 9 with switch S4 interlocked therewith.

What is claimed is:

1. An exposure time control circuit for a camera adapted for manual and automatic exposure control, comprising:

a photoelectric element responsive to scene brightness;

a fixed resistor;

means for controlling the exposure;

a variable resistance element including a first and a second independently movable member for varying the resistance between the end terminals of said variable resistance element, said first movable member being at least movable in accordance with the setting of the film sensitivity and said second movable member being movable in accordance with the manually set exposure time;

first switching means having a first position for connecting said first movable member to one of said end terminals and a second position to connect said second movable member to said one end terminal;

manually operable second switching means having a first position for connecting a first output signal formed between said photoelectric element and said variable resistance element to said means for controlling the exposure with said first switching means in said first position, and a second position for connecting a second output signal formed between said fixed resistor and said variable resistance element to said means for controlling the exposure with said first switching means in said second position;

a capacitor for selectively storing said first or second output; and third switching means having an open position for selectively isolating said capacitor from said first and second outputs and a closed position for connecting said capacitor to said first or second outputs in accordance with the position of said second switching means, said means for controlling being responsive to the signal stored by said capacitor.

2. An exposure time control circuit as in claim 1 wherein said first movable member is also movable in accordance with the diaphragm aperture setting.

3. An exposure time control circuit as in claim 1 further comprising means for indicating the exposure time in accordance with said first output, and wherein said first switching means is adapted to be moved between said first and second positions at least partially in response to the camera shutter release operation.

4. An exposure time control circuit as in claim 1 wherein said third switching means is adapted to be normally closed and being opened upon exposure operation of the camera before said first switching means is moved from said first to said second position.

5. An exposure time control circuit as in claim 4 wherein said first and second switching means are independently operable from one another and said first switching means is moved between said first and second positions in response to the camera shutter release operation.

6. An exposure time control circuit as in claim 5 wherein said first switching means includes first and second switch elements interlocked with one another, the first and second positions of said first switching means connecting said first switch element between said fixed resistor and said variable resistance element and between said photoelectric element and said variable resistance element, respectively; and the first and second positions of said first switching means connecting said second switch element between said first movable member and said one output terminal and between said second movable member and said one output terminal, respectively.

7. An exposure time control circuit as in claim 6 wherein said second switching means in said first position is connected with said first switch element through said third switching means and said second switching means in said second position is directly connected to said first switch element.

8. An exposure time control circuit as in claim 7 wherein one terminal of said capacitor is connected between said second and third switching means.

9. An exposure time control circuit as in claim 1 wherein said second and at least a portion of said first switching means are interlocked with one another.

10. An exposure time control circuit as in claim 9 further comprising means for providing a substantially constant current to said photoelectric element and said fixed resistor, and wherein said fixed resistor and said photoelectric element are connected in opposite branches of a parallel network having one node connected to said means for providing a substantially constant current and the other node connected to the other end terminal of said variable resistance element.

11. An exposure time control circuit as in claim 10 wherein said second switching means in said first position is connected to said first output signal through said third switching means and said second switching means in said second position is connected to said second output signal.

12. An exposure time control circuit as in claim 11 wherein one end of said capacitor is connected between said second switching means and said means for controlling exposure.

13. An exposure time control circuit as in claim 10 wherein said third switching means is adapted to be normally closed to be opened upon exposure operation of the camera after said first switching means is moved from said first position to said second position.

14. An exposure time control circuit as in claim 13 wherein said first switching means includes first and second switch elements independently operable from one another and said first switch element being interlocked with said second switching means, said first and second positions of said second switching means connecting said first switch element between said one end terminal and said first movable member and between said one end terminal and said second switch element, respectively; said second switch element having first and second positions and being changed from said first to said second position before said third switching means is opened, said first position connecting said second switch element to said first movable member and said second position connecting said second switch element to said second movable member.

15. An exposure time control circuit as in claim 14 wherein said third switching means interconnects said second switching means with said means for controlling the exposure and one terminal of said capacitor is connected between said third switching means and said means for controlling the exposure.

16. An exposure time controlling circuit for a camera comprising:
    a photoelectric element responsive to scene brightness;
    a constant resistor;
    manually operable first switching means for alternatively selecting one of said photoelectric element or said constant resistor to be electrically connected in the circuit;
    a pair of terminals;
    a variable resistance element having first and second movable members for varying the resistance between said pair of terminals, said first movable member being movable in accordance with at least one manual exposure information setting other than manual exposure time setting and said second movable member being movable in accordance with manual exposure time setting;
    second switching means for connecting one of said first or said second movable members to vary the resistance between said pair of terminals;
    means for controlling the exposure time responsive to a first output determined by said first switching means selecting said photoelectric element and the resistance between said pair of terminals as determined by said second switching means connecting said first movable member, or a second output determined by said first switching means selecting said constant resistor and the resistance between said pair of terminals as determined by said second switching means connecting said second movable member;
    a capacitor for storing said first or second output; and
    third switching means for selectively isolating said capacitor from said first and second output, said controlling means being responsive to the stored output of said capacitor.

17. An exposure time control circuit as in claim 16 further comprising means for indicating the exposure time controlled by said first output, and wherein said second switching means is adapted to normally connect said first movable member and to alternatively connect said second movable member in response to camera release operation.

18. An exposure time control circuit as in claim 17 wherein said first switching means alternatively connects either one of said first or second outputs to said capacitor and said indicating means being connected to said first output.

19. An exposure time control circuit as in claim 18 wherein said third switching means is a switch connected between said first output and said first switching means and adapted to be normally closed and to be opened upon exposure operation before said second switching means connects said second movable member to vary the resistance between said pair of terminals.

20. An exposure time control circuit as in claim 18 further comprising a fourth switching means for connecting said first movable member to vary the resistance between said pair of terminals with said first switching means connecting said first output to said capacitor, and wherein said third switching means is a switch connected between said first switching means and said capacitor and adapted to be normally closed and to be opend upon exposure operation after said second switching means connects said second movable member to vary the resistance between said pair of terminals.

* * * * *